US 12,394,159 B2

(12) United States Patent
Kulkarni et al.

(10) Patent No.: US 12,394,159 B2
(45) Date of Patent: Aug. 19, 2025

(54) VIRTUAL REALITY BASED PUSH NOTIFICATIONS

(71) Applicant: INTERNATIONAL BUSINESS MACHINES CORPORATION, Armonk, NY (US)

(72) Inventors: Ashwin Arvind Kulkarni, Aurangabad (IN); Hardik Dadhich, Ajmer (IN); Pradeep Gopalgowda, Bangalore (IN); Badekila Ganesh Prashanth Bhat, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 478 days.

(21) Appl. No.: 17/931,570

(22) Filed: Sep. 13, 2022

(65) Prior Publication Data

US 2024/0087240 A1    Mar. 14, 2024

(51) Int. Cl.
G06T 19/00 (2011.01)
G06F 40/30 (2020.01)
G06T 13/40 (2011.01)
G06V 10/82 (2022.01)

(52) U.S. Cl.
CPC ............ G06T 19/006 (2013.01); G06F 40/30 (2020.01); G06T 13/40 (2013.01); G06V 10/82 (2022.01)

(58) Field of Classification Search
CPC ....... G06T 19/006; G06T 13/40; G06F 40/30; G06V 10/82
See application file for complete search history.

(56) References Cited

U.S. PATENT DOCUMENTS

| 7,280,818 | B2* | 10/2007 | Clayton | .................. H04L 12/66 455/406 |
| 9,990,770 | B2 | 6/2018 | Anderson | |
| RE47,974 | E* | 5/2020 | Gelfenbeyn | ........ G10L 15/1815 |
| 10,838,587 | B2 | 11/2020 | Tippana | |
| 11,211,165 | B1* | 12/2021 | Nosrati | ................. G16H 80/00 |
| 11,223,732 | B1* | 1/2022 | Willis | ................. H04N 1/00488 |
| 11,291,921 | B1* | 4/2022 | Schindler | .............. H04L 67/131 |
| 11,425,982 | B1* | 8/2022 | Taylor | .................... A45D 34/04 |
| 11,699,256 | B1* | 7/2023 | Willardson | ............. G06F 40/35 345/633 |

(Continued)

FOREIGN PATENT DOCUMENTS

IN    201841049561 A    7/2020

OTHER PUBLICATIONS

Avatarsdk, "Cloud SDK, Lightweight "Cloud SDK" Scalable to Unlimited No. of Users," Avatarsdk.com, [accessed Jul. 1, 2022], 1 pg., Retrieved from the Internet: <https://avatarsdk.com/cloud-sdk>.

(Continued)

*Primary Examiner* — Kevin Ky
(74) *Attorney, Agent, or Firm* — Andre L. Adkins

(57) ABSTRACT

A system, method, and computer product for virtual reality based push notifications is provided. The method may include pushing a notification to a user-side computing device hosting a VR environment being utilized by a user and evaluating compatibility between the notification and the user-side computing device hosting the VR environment for the user. The method further includes based on the evaluation, generating a notification media content derived from the notification.

17 Claims, 8 Drawing Sheets

(56) References Cited

U.S. PATENT DOCUMENTS

| | | | | |
|---|---|---|---|---|
| 11,735,028 | B2* | 8/2023 | Williams | G06N 20/00 |
| | | | | 706/8 |
| 12,093,655 | B1* | 9/2024 | Montenegro | G06F 40/35 |
| 2015/0287403 | A1 | 10/2015 | Holzer Zaslansky | |
| 2016/0335801 | A1* | 11/2016 | Yoon | G06F 3/04842 |
| 2018/0047212 | A1* | 2/2018 | Long | H04L 51/224 |
| 2018/0167342 | A1* | 6/2018 | Lewis | H04L 67/535 |
| 2021/0209676 | A1 | 7/2021 | Deol | |
| 2021/0351977 | A1* | 11/2021 | T.V. | H04L 41/0803 |
| 2022/0020363 | A1* | 1/2022 | Vasquez | G10L 15/22 |
| 2022/0108262 | A1* | 4/2022 | Cella | G05B 17/02 |
| 2022/0163945 | A1* | 5/2022 | Hussain | G09B 5/02 |
| 2022/0169401 | A1* | 6/2022 | Di Cosola | B60L 53/12 |
| 2022/0182430 | A1* | 6/2022 | Bennett-James | |
| | | | | H04N 21/44008 |
| 2023/0095505 | A1* | 3/2023 | Dicosola | G09F 21/08 |
| | | | | 701/3 |
| 2023/0128648 | A1* | 4/2023 | Varada | H04L 67/55 |
| | | | | 709/204 |
| 2023/0186177 | A1* | 6/2023 | Desai | G06Q 20/40145 |
| | | | | 705/5 |
| 2023/0237797 | A1* | 7/2023 | Doken | G06T 11/00 |
| | | | | 345/633 |

OTHER PUBLICATIONS

Bozorgzadeh, "Avatars Will Be Our Guides in Immersive AR Worlds—and Brands Need to Be Ready," Apr. 4, 2019, Venturebeat.com, [accessed Jul. 1, 2022], 10 pgs., Retrieved from the Internet: <https://venturebeat.com/2019/04/04/avatars-will-be-our-guides-in-Immersive-ar-worlds-and-brands-need-to-be-ready/>.

Embody Digital, "AR Avatar Director From Embodydigital.com: Express Yourself in A/R in 3D Using Only Your Voice," YouTube.com, [accessed Jul. 1, 2022], 3 pgs., Retrieved from the Internet: <https://www.youtube.com/watch?v=CHrPKXLCuKI>.

Feltham, "Holoswitch Sends Your Smartphone Notifications to You While in VR," VentureBeat.com, Apr. 12, 2020, [accessed Jul. 1, 2022], 6 pgs., Retrieved from the Internet: <https://venturebeat.com/2020/04/12/holoswitch-sends-your-smartphone-notifications-to-you-while-in-vr/>.

Gallagher, "AR/VR Headset Hints & Web App Push Notification Support Found in IOS 15.4 Beta," AppleInsider.com, Feb. 1, 2022, [accessed Jul. 1, 2022], 10 pgs., Retrieved from the Internet: <https://appleinsider.com/articles/22/02/01/arvr-headset-hints-web-app-push-notification-support-found-in-ios-154-beta>.

Langston, "You Can Actually Feel Like You're in the Same Place: Microsoft Mesh Powers Shared Experiences in Mixed Reality," Microsoft.com, Mar. 2, 2021, [accessed Jul. 1, 2022], 9 pgs., Retrieved from the Internet: <https://news.microsoft.com/innovation-stories/microsoft-mesh/>.

Mell et al., "The NIST Definition of Cloud Computing", National Institute of Standards and Technology, Special Publication 800-145, Sep. 2011, pp. 1-7.

Navin M, "Future of e-Commerce: 3D Avatar and Virtual Try-on as a Game Changer," AR/VR Journey: Augmented & Virtual Reality Magazine, Sep. 26, 2019, [accessed Jul. 1, 2022], 7 pgs., Retrieved from the Internet: <https://arvrjourney.com/future-of-e-commerce-3d-avatar-and-virtual-try-on-as-a-game-changer-7c9d5369a418>.

Rzayev, "Notification in VR: The Effect of Notification Placement, Task and Environment," Oct. 2019, ResearchGate, 14 pgs., Chi Play '19, Oct. 22-25, 2019, Barcelona, Spain, ACM.

Sprigg, "8th Wall and Ready Player Me Partner to Bring Custom, Interactive Avatars into Web-based Augmented Reality Experiences," Augmented Reality News, Feb. 15, 2022, Auganix.org, [accessed May 24, 2022], 3 pgs., Retrieved from the Internet: <https://www.auganix.org/8th-wall-and-ready-player-me-partner-to-bring-custom-interactive-avatars-into-web-based-augmented-reality-experiences/>.

Vincent, "That Walmart VR Shopping Video is Old News—But So is the Metaverse," The Verge, Jan. 5, 2022, [accessed Jul. 1, 2022] 4 pgs., Retrieved from the Internet: <https://www.theverge.com/tldr/2022/1/5/22868323/walmart-metaverse-shopping-video-viral-old>.

Zenner, "Immersive Notification Framework: Adaptive & Plausible Notifications in Virtual Reality," CHI 2018, Apr. 21-26, 2018, Montreal QC, Canada, ACM, 6 pgs.

* cited by examiner

VIRTUAL REALITY BASED PUSH NOTIFICATIONS

BACKGROUND

The present invention relates generally to virtual reality/augmented reality environments and to integrating these environments with other computer applications. More particularly, the present invention relates to using push notifications to present avatars in virtual reality environments.

Virtual Reality (VR) experiences consist of a user being immersed in a simulated environment in order to browse and interact with virtual objects and/or spaces. Currently, users participate in VR environments by utilizing headsets, smart glasses, computing devices, and other applicable equipment; however, it is probable for a user to allow notifications to go undetected while the user is within the VR environment due to the abundant amount of notifications received by devices on a daily basis. Because of the limited attention span of the human user (only able to focus on just the VR environment at one time), as well as the large quantity of computing resources required to sustain the VR experience, it is common for real-time notification systems to be external to said resources resulting in notifications going unnoticed while the user is immersed in the VR environment.

SUMMARY

Additional aspects and/or advantages will be set forth in part in the description which follows and, in part, will be apparent from the description, or may be learned by practice of the invention.

A system, method, and computer product for virtual reality based push notifications is disclosed herein. In some embodiments, the computer-implemented method for virtual reality (VR) based push notifications includes pushing, by a computing device, a notification to a user-side computing device hosting a VR environment being utilized by a user; evaluating, by the computing device, compatibility between the notification and the user-side computing device hosting the VR environment for the user; and based on the evaluation, generating, by the computing device, a notification media content derived from the notification.

According to an embodiment of the present disclosure, a VR system includes a VR controller including one or more processors and a computer-readable storage medium coupled to the one or more processors storing program instructions, the VR controller being configured to generate a VR environment with interactive notification avatars derived from push notification embedded within. The VR system also includes a VR headset communicatively connected to the VR controller that is configured to display a VR environment to a user including the interactive notification avatars, a sensor communicatively connected to the VR controller, and a display communicatively connected to the VR controller. The program instructions, when executed by the one or more processors, cause the one or more processors to perform operations including pushing a notification to a user-side computing device hosting a VR environment being utilized by a user; evaluating compatibility between the notification and the user-side computing device hosting the VR environment for the user; and based on the evaluation, generating a notification media content derived from the notification.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
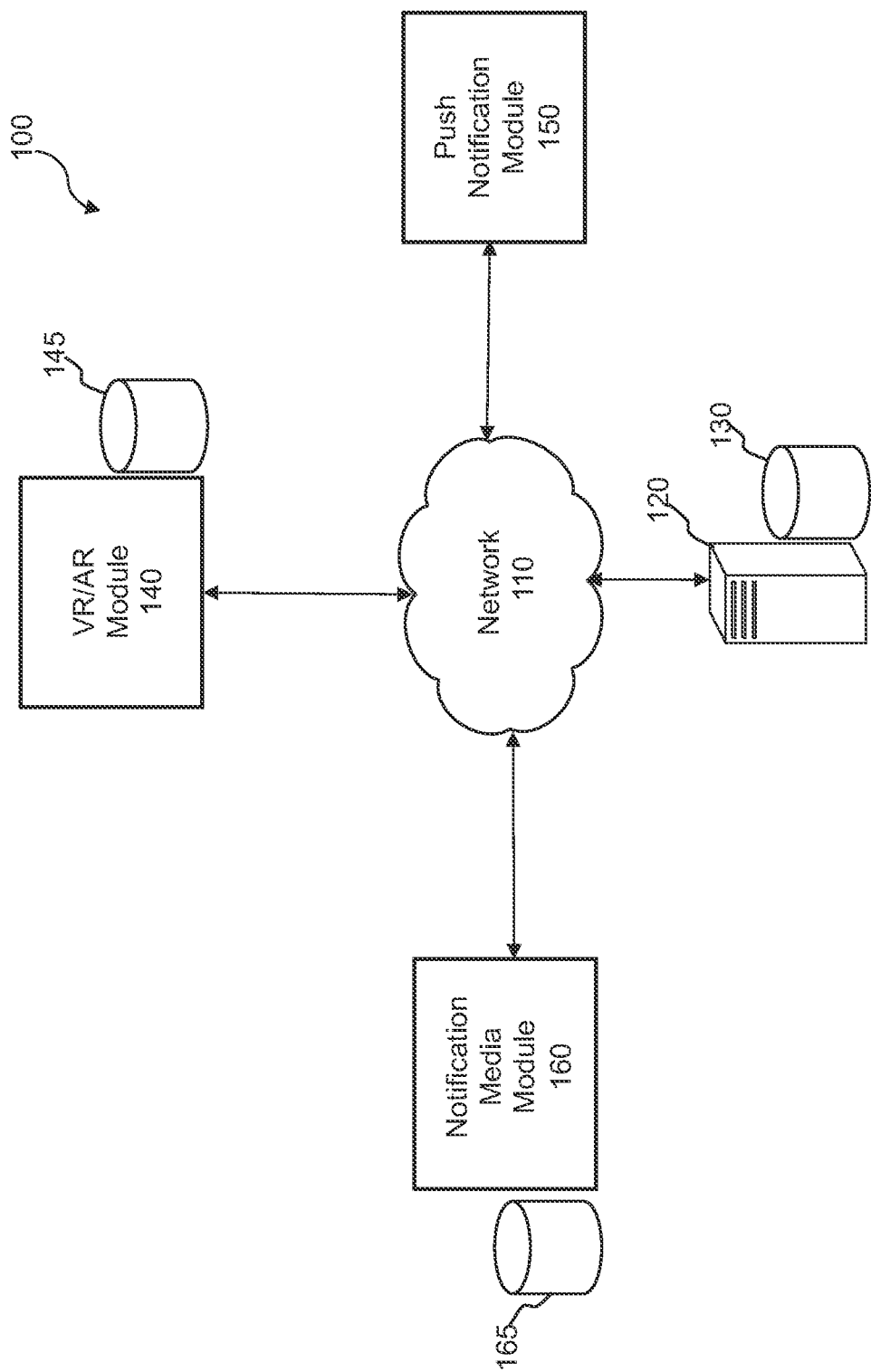
FIG. 1 illustrates a functional block diagram illustrating a virtual reality-based push notification environment according to at least one embodiment.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for virtual reality based push notifications. Currently, push notifications are provided to user interfaces of computing devices from a backend server or application. The push notifications notify the receiving party of applicable messages associated with the source server/application in real-time. As push notifications continue to become the most popular form of receiving alerts, the amount of push notifications received in relatively short timeframes grows immensely. As a result, the probability of users missing the opportunity to view notifications increases proportionally with the amount of push notifications received. In particular, users immersed within VR and/or augmented reality (AR) environments not only lack the ability to receive push notifications in real-time, but also the ability to interact with push notifications within VR environments. Thus, the present embodiments have the capacity to provide push notifications to users within VR/AR environments by not only receiving push notifications directly within the VR environment, but also via avatars rendered based on received notifications configured to be embedded in the VR/AR environment. The avatars are configured to interact with the users and provide expressions of sentiments along with applicable multimedia relating to the notifications provided to the users within VR environments. In addition, the present embodiments further have the capacity to analyze computing devices of the users receiving the notifications to determine if the computing devices have the capacity to receive the avatar within VR environments, and if not, then multimedia content is derived from the notification for presentation on the applicable computing device in a non-VR environment.

As described herein, virtual reality refers to a computing environment configured to support computer-generated objects and computer mediated reality incorporating visual, auditory, and other forms of sensory feedback. It should be noted that a VR environment may be provided by any applicable computing device(s) configured to support a VR, augmented reality, and/or mixed reality user interacting with their surroundings, said interactions including but not limited to user movement/gazing, manipulation of virtual and non-virtual objects, or any other applicable interactions between users and computing devices known to those of ordinary skill in the art.

As described herein, augmented reality is technology that enables enhancement of user perception of a real-world environment through superimposition of a digital overlay in a display interface providing a view of such environment. Augmented reality enables display of digital elements to highlight or otherwise annotate specific features of the physical world based upon data collection and analysis. For instance, augmented reality can provide respective visualizations of various layers of information relevant to displayed real-world scenes.

As described herein, an avatar is a static or animated digital character model formed using a graphical image configured to represent components within the VR environment. In some embodiments, the avatar is configured to interact with individuals within the VR environment and may produce media content, notifications, and/or provide access to particular destinations (e.g., transfers VR users to other applications the push notifications are sourced from).

As described herein, push notifications are content delivered to a computing device via one or more delivery channels including but not limited to web-based/app-based notifications, Short Message Peer-to-Peer (SMPP) protocol, email, SMS, instant messaging, social media application messaging, and any other applicable delivery channel configured to inform a user in real-time. In some embodiments, push notifications are delivered via push notification delivery channels through which the message is delivered to a computing device via an application operating on the computing device (e.g., user device, etc.) or directly to the virtual reality environment. Push notifications are messages presented on the user's device sourced from particular applications that may be opened or ignored. These notifications may convey a variety of information such as messages, reminders, updates, promotions, etc.

Referring now to FIG. 1, an environment 100 for virtual reality-based notifications is depicted according to an exemplary embodiment. FIG. 1 provides only an illustration of implementation and does not imply any limitations regarding the environments in which different embodiments may be implemented. Modifications to environment 100 may be made by those skilled in the art without departing from the scope of the invention as recited by the claims. In some embodiments, environment 100 includes a server 120 communicatively coupled to a database 130, a VR/AR module 140 communicatively coupled to a VR/AR database 145, a push-notification module 150 ("PNM"), and a notification media module 160 ("NMM") communicatively coupled to a NMM database 165, each of which are communicatively coupled over a network 110. It should be noted that environment 100 is a network of computers in which the illustrative embodiments may be implemented, and Network 110 is the medium used to provide communications links between various devices and computers connected together within environment 100. Network 110 may include connections, such as wire, wireless communication links, or fiber optic cables. Network 110 may be embodied as a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. It should be appreciated that FIG. 1 provides only an illustration of one implementation and does not imply any limitations with regard to the environments in which different embodiments may be implemented. Many modifications to the depicted environments may be made based on design and implementation requirements.

Server 120 is configured to provide data sources for assisting VR/AR module 140 to create and maintain a virtual reality (VR) and/or augmented reality (AR) environment designed to be viewed from applicable user-side computing devices. In some embodiments, server 120 is configured to generate a centralized platform configured to serve as a data source and management tool for VR/AR module 140. For example, information pertaining to a user operating in the VR/AR environment (e.g., user preferences, personal information, VR environment features, etc.) may be collected from users via the applicable computing device and integrated into the VR environment in real-time. Database 130 is configured to store applicable data processed by server 120 and derivatives associated with the VR environment including but not limited to predictions associated with interactions, movements, vision, preferences, etc. of users within the VR environment. In some embodiments, server 120 may utilize one or more machine learning models to predict types of push notifications that a user within the VR environment is likely to disregard based on said user's activity history on applicable computing devices.

VR/AR module 140 is configured to be associated with one or more computing devices, which may respectively include, without limitation, smartphones, tablet computers, laptop computers, desktop computers, computer-mediated reality (CMR) devices/VR devices, and/or other applicable hardware/software. VR/AR database 145 contains one or more repositories of data collected, processed, and/or presented within the VR environment including but not limited to motion data (e.g., motion patterns) associated with users, VR environment-based analytics, and any other applicable data associated with virtual reality systems known to those of ordinary skill in the art. In some embodiments, VR/AR module 140 may be configured to operate through a web browser, as a dedicated app or other type of software application running either fully or partially on a computing system. It should be noted that due to the possibility that VR/AR module 140 can generate VR/AR content that is limited to CMR devices (e.g., cannot be viewed in the same manner on a smartphone not having VR/AR capabilities), server 120 is configured to analyze the applicable computing device presenting content of VR/AR module 140 to the applicable user in order for server 120 to determine if the VR/AR content is compatible with non-CMR devices. For example, a non-CMR device may not be configured to depict content of VR/AR module 140 to the user in its original state, in which server 120 is configured to instruct NMM 160 to generate notification media content derived from one or more push notifications generated by PNM 150. As a result, content that would otherwise be visualized within the VR environment on CMR devices may be viewed in a modified manner that the non-CMR device is configured to depict (e.g., video file including the animations of the avatar derived from the push notification).

PNM 150 serves as a mechanism to provide push notifications to VR/AR module 140 in a manner that supports interactivity between the user and notifications within the VR environment. In some embodiments, PNM 150 hosts one or more application programing interfaces (API) which may be utilized by VR/AR module 140. In particular, PNM 150 facilitates real-time information being provided to the VR environment by callbacks, such as transfer protocol push API, etc. For example, real-time notifications may be integrated into the VR environment by VR/AR module 140 in which the integration may be based on alerts received by the user, spatial queries, webhooks, etc. based upon factors such as current context of conversation/actions of VR users, geographic location of applicable computing devices, location of the user within the VR environment, etc.

In some embodiments, PNM 150 sends push notifications through a third-party push notification service that is configured to send the push notification to VR/AR module 140 and/or the application operating on the applicable computing device. However, the manner the push notifications are presented within the VR environment is managed by NMM 160 due to the fact that NMM 160 is configured to generate push notification media including but not limited to interactive notification avatars, notification media content, and/or any derivative thereof (e.g., video files including components of the original push notification). In some embodiments, interactive notification avatars are digital avatars that reflect components of a particular push notification within the VR environment, and notification media content is any applicable text, audio, video, etc. configured to express one or more components of the particular push notification that are not configured to be presented on non-CMR devices due to its computing resource and/or feature limitations. Interactive notification avatars are configured to be overlayed, embedded, etc. in the VR environment by NMM 160 rendering them into the VR environment with appropriate context to the simulation and use visual cues to reflect applicable emotional and physical states via the avatar based on sentiments derived from analyses or evaluations of the push notifications. NMM 160 communicates with PNM 150 in order to generate a plurality of metadata associated with one or more push notifications, in which the plurality of metadata may pertain to identified expressions within the push notification, identified sentiments within the push notification, identifiers (source of the push notification), timestamps, tags, or any other applicable type of metadata associated with push notifications known to those of ordinary skill of the art. For example, NMM 160 may analyze or evaluate a push notification and extract the sentiments and expressions reflected within the push notification and tag a plurality of generated metadata relating to an excited tone of the push notification to the push notification. NMM 160 may utilize this metadata relating to the extracted sentiment (or expressions, identifiers, timestamps, tags, etc.) to generate the interactive notification avatar reflecting an excited expression within the VR/AR environment. The avatar may include a face and may have facial gestures which indicate the excited expression. NMM database 165 is configured to store the plurality of metadata along with a plurality of parameters derived from one or more of server 120 and VR/AR module 140. The plurality of parameters may pertain to visual/appearance features and other applicable features of the interactive notification avatar. In some embodiments, user interaction with the interactive notification avatar triggers PNM 150 to transfer the user over from the VR environment to the applicable source application associated with the push notification for direct interaction on the applicable computing device.

Figure 2:
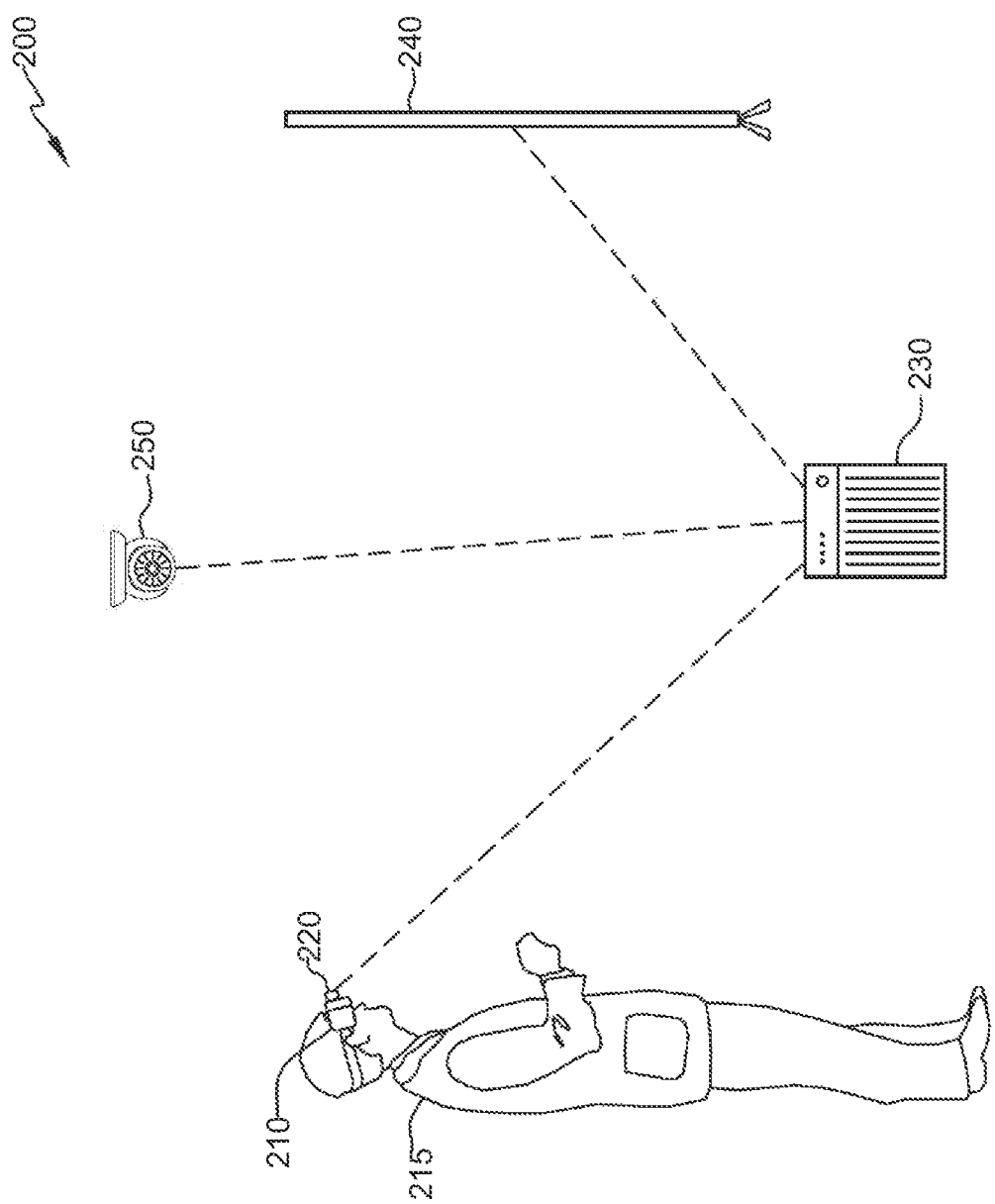
FIG. 2 illustrates an exemplary enhanced virtual reality system, according to at least one embodiment.

Referring now to FIG. 2, an enhanced VR system 200 is depicted according to an exemplary embodiment. VR system 200 is hosted and managed by VR/AR module 140, and includes a VR/AR mode and a non-VR/AR mode. In some embodiments, VR system 200 comprises VR headset 210 configured to be affixed to a user 215, headset camera 220, VR controller 230, display device 240, and ceiling-mounted camera 250. These components of VR system 200 are wirelessly connected together to provide a VR experience for user 215 who is immersed into the VR environment. Information derived from VR headset 210, headset camera 220, and ceiling-mounted camera 250 is received and analyzed by VR controller 230. VR controller 230 is configured to determine that VR/AR module 140 has received a push notification from PNM 150, in which VR controller 230 instructs user 215 that a push notification has been received and may transmit a prompt to display device 240 in order to receive a selection as to whether user 215 wants to view the push notification in VR/AR mode or non-VR/AR mode. In a preferred embodiment, selection of VR/AR mode triggers NMM 160 to request the push notification from PNM 150 in order to analyze the push notification and generate the plurality of metadata and parameters from the push notification.

In some embodiments, VR headset 210 includes a plurality of sensors configured to collect data from user 215. VR/AR module 140 transmits the collected data to server 120. Sensors may include position sensors, pressure sensors, cameras, microphones, temperature sensors, biological-based sensors (e.g., heartrate, movement, facial expressions, serotonin, dopamine, etc.), or any other applicable type of sensors known to those of ordinary skill in the art. In some embodiments, the plurality of sensors support VR/AR module 140 evaluating electrical activity produced by muscle tissue of user 215, also referred to as electromyography (EMG) in order to detect patterns of motions and associated emotional responses for the purpose of transmitting the resulting data to NMM 160. NMM 160 maps the collected data to one or more avatar models configured to be stored in NMM database 165 in order to generate the interactive notification avatar to express sentiments that match those of user 215. The avatar includes expressions such as facial expressions that reflect sentiments based on the plurality of metadata and patterns of motion for the purpose of the avatar including appropriate reactions to present each push notification. For example, one of the avatar models may be an emotional model comprising the set of detected motion patterns, a set of derived motion patterns, associated facial expressions, and associated emotional responses of user 215. As another example, detected motion patterns and derived motion patterns of the emotional model can be rendered by NMM 160 at the avatar from the use of electromyography to generate virtual muscle activation levels in the avatar.

Figure 3:
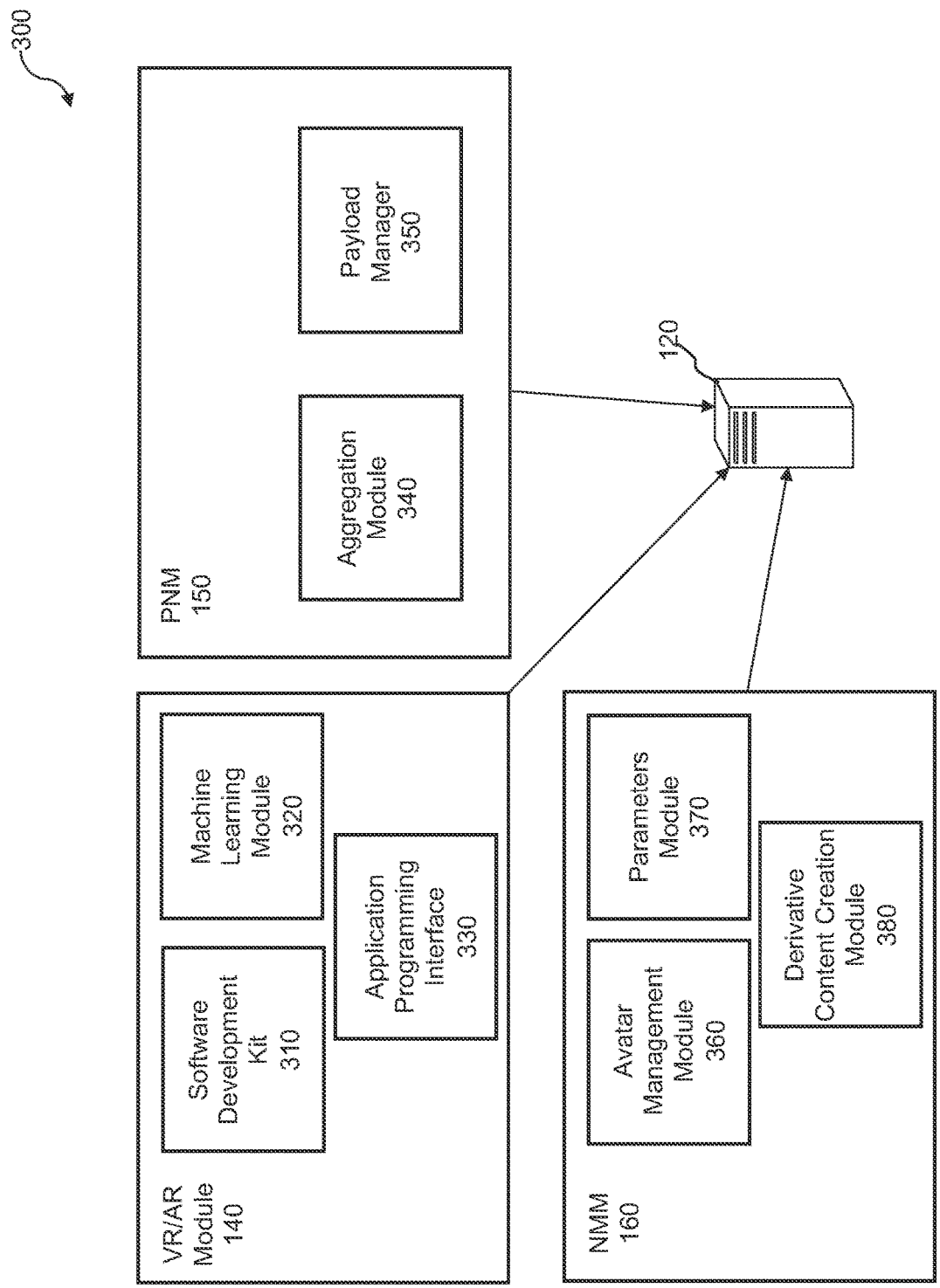
FIG. 3 illustrates an exemplary block diagram illustrating modules associated with the environment of FIG. 1, according to at least one embodiment.

Referring now to FIG. 3, a plurality of modules 300 associated with environment 100 is depicted according to an exemplary embodiment. In some embodiments, VR/AR module 140 includes a software development kit 310 (SDK), a machine learning module 320, and an application programming interface 330. PNM 150 includes an aggregation module 340 and a payload manager 350, and NMM 160 includes an avatar management module 360, a parameters module 370, and a derivative content creation module 380.

Software development kit 310 is configured to allow VR/AR module 140 to integrate one or more applications and/or platforms with the VR environment. For example, SDK 310 may not only integrate the push notification from PNM 150 into the VR environment via the avatar, but also context-based components from the push notification such as relevant solutions to address an element of the push notification, derivative advertisements (e.g., embedded VR ads derived from analyses of push notifications), and other applicable features configured to be embedded in VR environments known to those of ordinary skill in the art. SDK 310 is communicatively coupled to NMM 160 in order for the avatar to be embedded into the VR environment, in which server 120 confirms the CMR device is configured to embed the avatar into the VR environment. NMM 160 transmits the plurality of parameters to VR/AR module 140 which SDK 310 utilizes to generate the avatar based on the content of the push notification. In some embodiments, VR/AR module 140 receives the plurality of parameters as JSON files. It should be noted that SDK 310 may be a third party application configured to handle the visualization of the avatar within the VR environment. SDK 310 may further render an interactive preview model of the avatar that is presented on the centralized platform allowing user 215 to toggle, edit, etc. the appearance of the avatar before SDK 310 renders it into the VR environment.

Machine learning module 320 is configured to use one or more heuristics and/or machine learning models for performing one or more of the various aspects as described herein. In some embodiments, the machine learning models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. In some embodiments, machine learning module 320 utilizes one or more machine learning models to generate predictions pertaining to the reaction of user 215 to particular push notifications. Training data is sourced from NMM 160 (e.g., data used to perform the mapping of patterns) and server 120 (e.g., user preferences, user browsing activity, etc.) to generate a prediction relating to the reaction of user 215 to a particular type of push notification. For example, user 215 may previously have received a push notification from a news source pertaining to the rise of inflation in which user 215 had an angry or annoyed reaction to which the sentiment is ascertainable based upon the electromyography process. Future push notifications including relevant and adjacent content (e.g., other news article push notifications) will be manifested in the VR environment via the avatar including an angry/annoyed facial expression matching that of user 215. In some embodiments, machine learning module 320 utilizes one or more machine learning algorithms to generate predictions pertaining to category classifications associated with the push notification based on its content. The category classifications are applied to applicable notifications (e.g., notifications including relevant content, similar content, etc.) processed in future iterations.

Machine learning module 320 further utilizes one or more machine learning models to render text-to-speech algorithms, such as natural language processing (NLP), on detected text content of the push notifications in order for NMM 160 to generate multimedia configured to be emitted from the avatar to user 215 within the VR environment. In other words, the machine learning models are configured to parse and translate the text of a push notification into an audio file which is transmitted to NMM 160 for integrating into the avatar during the avatar generation process. In some embodiments, machine learning module 320 utilizes data sourced from the plurality of sensors and headset camera 220 as training data for the one or more machine learning models, and the outputs of the models are parameters configured to be included in the plurality of parameters stored in NMM database 165. The aforementioned process results in the generation of an avatar by NMM 160 that includes an appearance and features similar to user 215 such as profile (e.g., face, eyes, gestures, etc.), voice, posture, etc.

Aggregation module 340 is configured to support the analysis of push notifications by NMM 160 in an aggregated manner. As PNM 150 is continuously receiving and/or generating push notifications, aggregation module 340 is actively clustering/grouping push notifications into vectors based upon content, context, source application, etc. For example, push notifications that are consistently ignored by user 215 are grouped into a vector with low priority push notifications, while push notifications that user 215 consistently engages with are grouped into a vector with high priority which is processed by NMM 160 for extraction of sentiments/expressions and tagging of the plurality of metadata associated with the push notifications to parameters and other derivatives of the push notification. In some embodiments, NMM 160 utilizes machine learning module 320 to generate the plurality of metadata reflecting one or more components derived from the analyses of the push notification (e.g., sentiment, expression, source, time, etc.). The plurality of metadata may be tagged to the plurality of parameters. For example, text content detected within the push notification may be processed using natural language processing, and the text may be converted into speech by machine learning module 320. Tagging of the metadata to the parameters and other components derived from the push notification allow the sentiment, and any other relevant content of the push notifications to be accounted for in an aggregated manner and utilized during the avatar generation process. Payload manager 350 is configured to generate a payload designed to be included in the push notifications when PNM 150 generates them. It should be noted that push notifications are configured to include an identifier associated with the particular application that the push notification is sourced from in addition to the payload which may be a JSON file or any other applicable type of file designed to specify how user 215 is to be alerted in the VR environment. The payload may further include an interactive alert message to display on the CMR device along with applicable multimedia content associated with the push notification. In some embodiments, multimedia content is depicted within the VR environment by VR/AR module 140 embedding the avatar within the VR environment and multimedia content (e.g., audio file of the text to speech conversion, media content associated with the source application, etc.) being emitted from the avatar upon user 215 interacting with the alert message within the VR environment. For example, the user may click on a notification that is visually displayed. The clicking indicates that the user wants to see the notification. This clicking then causes the generation and display of the avatar in the VR environment. User 215 is immersed into the VR environment based on PNM 150 transmitting a push notification to VR/AR module 140 for user 215 to view in which the manner the push notification is presented depends on whether the VR system 200 is in VR/AR mode or non-VR/AR mode. When VR system 200 is in non-VR mode, the push notification may be presented to user 215 via email, text, URL link, etc.; however, when VR system 200 is in VR mode the push notification is presented to the CMR device in a manner in which the avatar is depicted in the VR environment relative to the viewpoint of user 215 based upon certain interactions with the notification. For example, a push notification may be received as a text notification within VR/AR mode in which user 215 acknowledges and/or does not dismiss the text notification directing the attention of user 215 to the avatar embedded within the VR environment.

Avatar management module 360 is tasked with generating the interactive notification avatar based on one or more of the plurality of parameters, the analysis of the push notification by NMM 160, and/or one or more avatar pre-defined templates. In some embodiments, avatar management module 360 supports creation and modification of avatars by user 215 utilizing the centralized platform. User 215 may provide customization via an avatar dashboard. Parameters module 370 is configured to collect and manage the plurality of parameters that avatar management module 360 utilizes to construct an avatar. Parameters may represent preferences and features (e.g., aesthetic, physical, etc.) of user 215; however, parameters may also account for avatar identifiers, flagging of notifications, and data derived from analyses of the push notification (e.g., notification type, notification text, avatar identification, etc.). The plurality of parameters may be derived from inputs provided to server 120 over the centralized platform, analysis of a notification performed by NMM 160, and/or based on data collected from the applicable sensors of VR system 200. Parameters may include but are not limited to avatar physical features, moods/expressions, sentiments, notification type, notification context, associated media content source (e.g., URL, etc.), or any other applicable type of parameter or feature configured to assist generation of virtual objects known to those of ordinary skill in the art.

Derivative content creation module 380 is designed to generate a notification media content derived from the notification provided by PNM 150. Derivative content creation module 380 generates the notification media content based on a VR flag assigned to the applicable receiving computing device indicating that the device receiving the interactive notification avatar may support virtual reality functions. The VR flags are assigned by server 120 based on analyses to ascertain the computing resources and capacity of the applicable receiving computing device. VR flags may be an assigned Boolean variable or any other applicable mechanism configured to identify a distinction between at least two designations. For example, server 120 may access the hardware and software capabilities of the applicable receiving computing device and determine that the interactive notification avatar cannot be depicted on said device. Based on that determination, the server 120 instructs NMM 160 to assign a VR flag to the interactive notification avatar being created indicating that the interactive notification avatar will not be embedded in the VR environment. The notification media content is derived from the interactive notification avatar and generated based on the interactive notification avatar including a VR flag indicating the receiving applicable computing device does not support VR environments. In some embodiments, the notification media content is a generated video file of the interactive notification avatar expressing the content, sentiment, and other relevant information of the applicable push notification. The notification media content may be a video, hologram, or any other applicable type of multi-media and may in some embodiments include the interactive notification avatar performing the same actions (e.g., expressing sentiment of notification, speaking text content of notification, interacting with user 215, etc.) that would have occurred if the interactive notification avatar were embedded in the VR environment. Avatar management module 360 stores the plurality of parameters, avatar models/templates, etc. in NMM database 165. In addition, NMM 160 stores the notification media content in NMM database 165, which may be cloud-based, and may transmit the notification media content to the applicable receiving computing device via a URL, text message, email, or any other applicable type of delivery mechanism for transmitting multimedia content. Upon the beginning of the generation process the avatars are assigned avatars identifiers by NMM 160, which are specific to the push notification source analyzed in order to generate the avatars.

Figure 4:
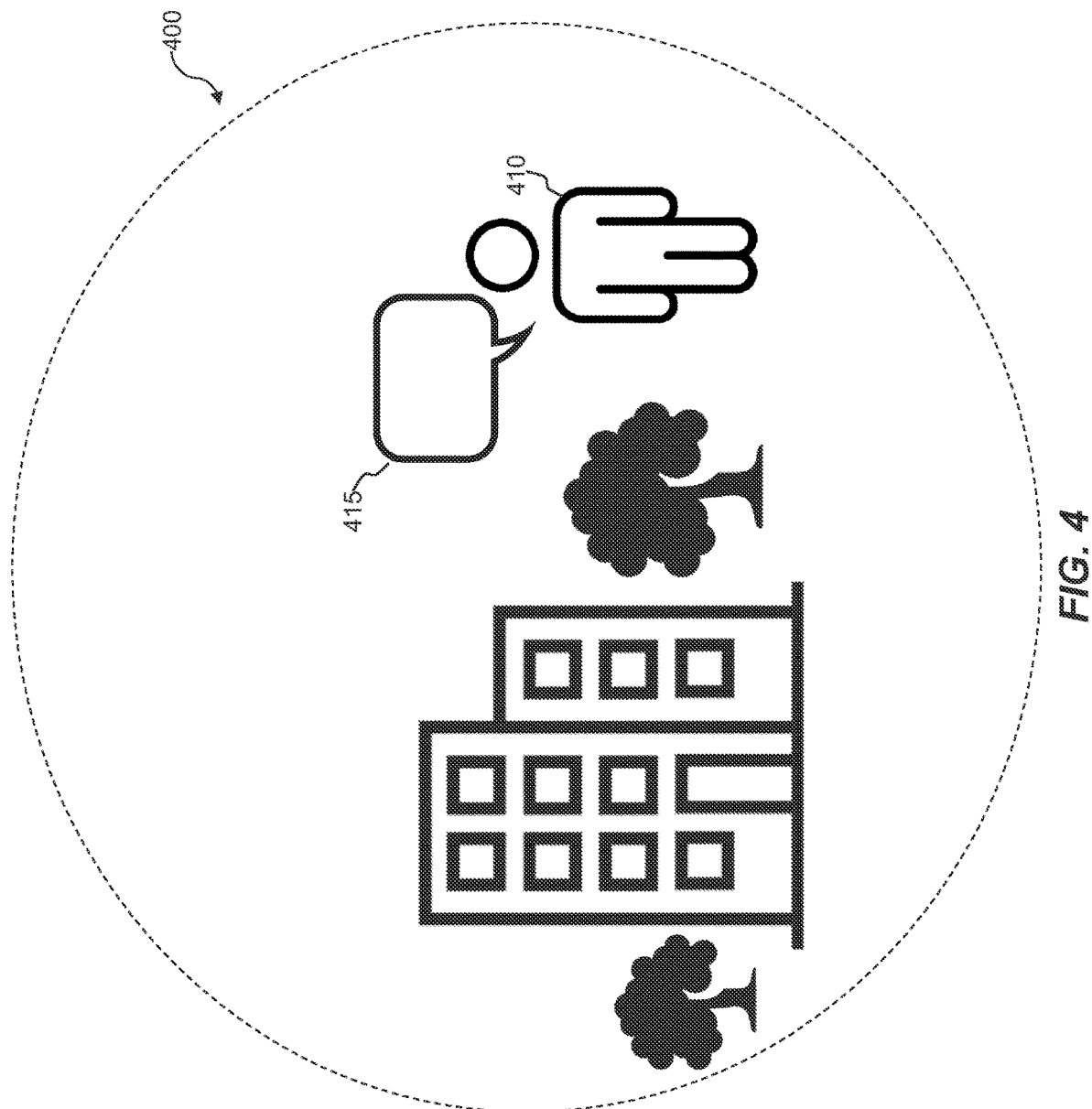
FIG. 4 illustrates an example VR view of a VR environment, according to at least one embodiment.

Referring now to FIG. 4, a view of a VR view 400 is depicted according to an exemplary embodiment. It should be noted that VR view 400 depicts the content displayed inside of VR headset 210 as user 215 would see it. Because VR view 400 takes place in the greater context of the real world (shown in FIG. 1), references may be made to the features of FIG. 1. An interactive notification avatar 410 included in VR view 400 is rendered to represent a push notification. In the illustrated embodiment, avatar 410 has the form of a human, although there are many other forms that avatar 410 could take. For example, the avatar forms can be non-human; animal, machine, or fantasy creature; stationary or mobile. In particular, avatar 410 manifests one or more of the plurality of parameters, plurality of metadata, and results of the analyses of the push notification by NMM 160 utilizing machine learning module 320. Avatar 410 emits multi-media content 415 (e.g., audio files of push notification content, videos, images etc.) derived from NMM 160. For example, avatar 410 may be depicted in VR view 400 expressing the physical features allocated by NMM 160 from the parameters and metadata, and the sentiment derived from the particular push notification via virtual expressions ascertained from the emotional model, and emitting audio derived from the text content of the push notification via an audio file generated from the text to speech conversion. In some embodiments, the appearance and actions/expressions of avatar 410 are established by NMM 160 instructing the machine learning module 320 to utilize a convolutional neural network ("CNN") to establish context of the push notification and by embedding the avatar 410 within the applicable type of VR environment derived from the ascertained context. For example, if user 215 is utilizing VR system 200 to engage in a gaming platform that is hosting a horror game, then NMM 160 is configured to utilize the aforementioned approach to establish the context of the current VR environment and generate avatar 410 including features associated with the horror game VR environment (e.g., ghost avatar appearance, horror creature avatar, etc.) in a manner in which avatar 410 is seamlessly integrated into the horror game VR environment. In some embodiments, VR controller 230 analyzes VR view 400 for objects within the VR environment that are near user 215 in order to determine the appropriate placement of avatar 410 within the VR environment, and various components of the VR environment in order optimize presentation of avatar 410. Such various VR environment components may include but are not limited to lighting effects, words, sounds (e.g., sound effects, music, etc.), color themes, geography, wildlife, characters, architecture, vehicles, apparel, language, speech patterns, time period, or any other applicable VR environment elements known to those of ordinary skill in the art.

In some embodiments, movements and/or static poses including facial expressions and hand gestures can be reflected in avatar 410. In addition, sounds of user 215 and other VR users may be reflected via avatar 410. Also, avatar 410 may produce various indicators and emissions aligning with the sentiment and context of the push notification with which the avatar 410 is associated. For example, the sentiment of the push notification derived from the emotional model and text to speech conversion of a push notification pertaining to the rise of inflation in the economy may indicate sadness and/or anger based on analyses derived from the emotional model. The avatar 410 may emit an ominous color (e.g., blue, red, etc.) and render the audio file with an ominous tone aligning with the sentiment of the push notification. During the presentation of avatar 410 within the VR environment, VR controller 230 may track activities, eye movements, and other stimulation-based reactions of user 215 to avatar 410 within the VR environment in order to modify and ultimately optimize the presentation avatar 410. For example, if VR controller 230 detects excessive squinting of user 215 during the presentation of avatar 410 in VR view 400, then VR controller 230 may instruct NMM 160 to adjust the brightness of avatar 410.

Avatar 410 may be rendered in the VR environment subject to the activity that the user 215 is partaking within the VR environment. For example, VR controller 230 may detect a lack of movement or activity within the VR environment in which controller 230 may instruct PNM 150 to transmit push notifications. NMM 160 may analyze each push notification individually in order for each push notification to have a distinct avatar 410; however, a single avatar may emit multiple audio files pertaining to various push notifications or multiple avatars may be embedded within the VR environment based VR controller 230 determining their placement relative to user 215. VR/AR module 140 may communicate with aggregation module 340 allowing PNM 150 to filter out push notifications likely to be ignored by user 215; thus, reducing the number of avatars rendered by NMM 160.

Figure 5:
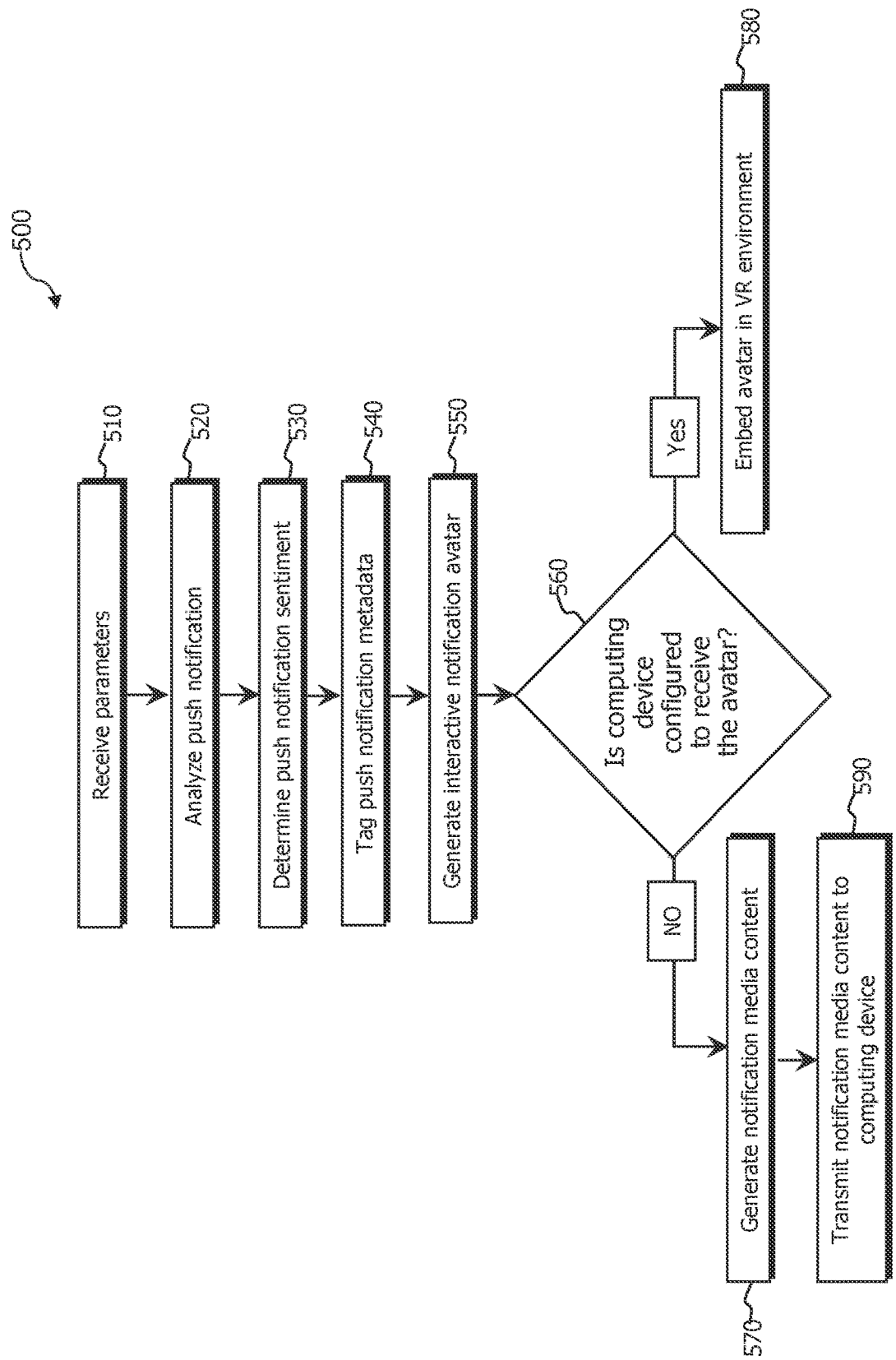
FIG. 5 illustrates a flowchart depicting a process for VR-based push notifications, according to at least one embodiment.

With the foregoing overview of the example architecture, it may be helpful now to consider a high-level discussion of an example process. FIG. 5 depicts a flowchart illustrating a computer-implemented process 500 for virtual reality-based push notifications, consistent with an illustrative embodiment. Process 500 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 510 of process 500, server 120 receives the plurality of parameters from PNM 150 and user 215 via inputs provided on the applicable computing device. The centralized platform may be a component of VR/AR module 140 allowing user 215 to provide inputs within the VR environment pertaining to VR environment preference, avatar preferences, personal information (e.g., contact information, etc.), and other applicable information. The plurality of parameters may also be derived from the analyses of push notifications performed by NMM 160 Components of the push notifications such as the notification type, the text content of the notification, the push notification sentiment, the VR flag, avatar ID, etc. may be included in the plurality of parameters. Although the parameters utilized by NMM 160 pertaining to the appearance of avatar 410 are generally derived from the applicable inputs of user 215, the parameters pertaining to appearance or other features of avatar 410 may also be derived from a list of predetermined avatar forms. VR controller 230 may select avatar features from the list based on the context of the applicable VR environment. For example, in the instance in which user 215 has not provided avatar preferences, VR controller 230 analyzes the VR environment in order to establish a context and to generate the avatar 410 based on the context, e.g., using the form of animals or objects from the list appropriate for the theme of the VR experience.

At step 520 of process 500, PNM 150 analyzes a push notification designed to be presented to user 215. The user 215 may subscribe to one or more services (also referred to as a "Push Subscription") granting PNM 150 permission to push notifications to server 120 and ultimately VR/AR module 140. In some embodiments, PNM 150 makes an API call (e.g., Web Push Protocol, etc.) to one or more push services by transmitting network requests to the applicable push services for validation. Application service keys are passed to the push services to verify the requesting application aligns with the push subscription. Assuming that server 120 and the applicable computing device communicatively coupled to VR/AR module 140 are online, the applicable push services deliver messages in response to the requests allowing VR/AR module 140 to decrypt data within the messages and dispatch push events. Push events may be dispatched in service workers (e.g., JavaScript files, etc.) configured to support functions such as but not limited to caching pages offline, analytics calls, etc. However, the content delivered to PNM 150 is transmitted to NMM 160 for analyses of the content to be rendered.

At step 530 of process 500, NMM 160 utilizes machine learning module 320 to perform text to speech conversion on the data received from PNM 150 in addition to performing other application functions. NMM 160 receiving the text data of each push notification in addition to the outputs of the emotional model allows NMM 160 to ascertain the sentiment of each push notification which is configured to be a parameter utilized to generate avatar 410. For example, a push notification pertaining to an offer on food includes a positive sentiment while a push notification pertaining to an applied overdraft fee from the bank account of user 215 includes a negative sentiment. Accordingly, during the creation of avatar 410, NMM 160 includes one or more expressions representing the ascertained sentiment configured to be expressed within the VR environment by avatar 410.

At step 540 of process 500, NMM 160 generates the metadata including the sentiments and expressions derived from analyses of the push notification and tags the plurality of metadata to the push notifications and components thereof such as the plurality of parameters used to build avatar 410. NMM 160 ascertaining the content and context of the push notifications, the emotional responses from VR system 200, and other applicable data derived from the push notifications triggers server 120 to analyze the applicable computing device receiving the push notification in order to determine whether generation of avatar 410 is necessary as opposed to PNM 150 simply transmitting a text-based push notification or generating a video file reflecting the animations of avatar 410 (notification media content). The plurality of metadata and the plurality of parameters are utilized by NMM 160 to generate avatar 410.

At step 550 of process 500, NMM 160 generates avatar 410 based on the plurality of parameters and the plurality of metadata. As previously mentioned, detected motion patterns and derived motion patterns of the emotional model sourced from VR system 200 can be created at avatar 410 by use of electromyography to generate virtual muscle activation levels in an avatar. In some embodiments, avatar 410 may be updated in real-time (or near real-time) as user 215 moves throughout the VR environment; however, initial generation of avatar 410 results in NMM 160 storing avatar 410 within NMM database 165 for retrieval by PNM 150 based on the assigned avatar ID.

At step 560 of process 500, server 120 makes a determination as to whether the applicable computing device is configured to receive avatar 410 for presentation. For example, server 120 analyzes the computing resources, bandwidth, etc. of the receiving computing device to confirm that the receiving computing device is a CMR device configured to portray avatar 410 within a VR/AR environment. Lack of components necessary for proper depiction of virtual objects within VR/AR environments is an indicator that the receiving computing device is not configured to visualize avatar 410. The determination made at step 560 is utilized by NMM 160 to assign the appropriate VR flag to the avatar being created.

If server 120 determines that the receiving computing device is not configured to visualize avatar 410 in a VR environment, then step 570 of process 500 occurs in which NMM 160 generates notification media content configured to include visualization of avatar 410 in a non-VR manner. For example, NMM 160 may generate a video file including avatar 410 emitting the audio file pertaining to the content of the push notification derived from the text to audio conversion process. In other embodiments, the notification media content may be any applicable derivative form of presentation of avatar 410 and/or the content of the notification (e.g., audio file, GIF file, etc.). Otherwise if server 120 determines that the receiving computing device is a CMR device configured to visualize avatar 410 in a VR/AR environment, then step 580 of process 500 occurs in which the avatar 410 is transmitted to VR/AR module 140 for embedding within the VR environment.

At step 590 of process 500, the notification media content video file is transmitted to the non-CMR device in order to present the push notification to user 215. In some embodiments, the video file is accessible by a URL link or any other applicable resource locating mechanism known to those of ordinary skill in the art.

The details and embodiments disclosed herein are provided by way of example and should not be construed as limiting the scope of the disclosed subject matter to the particular details or specific embodiments. Certain implementations may provide or apply the disclosed concepts and processes, with some variations, to VR system, VR platform, or CMR devices, whether location-based or not. In addition, avatar 410 may be utilized to present various types of manners to solicit interactions with VR system users within VR environments. For example, user 215 interacts with an avatar within a VR environment to respond to prompts for information, tutorials, webhooks, offers, etc. For example, in an instance where VR system 200 provides a gaming platform, in-game offers may be presented to the players via interactions with avatars embedded throughout the VR environment in which the avatars are configured to express the sentiment associated with the information they are presenting.

Figure 6:
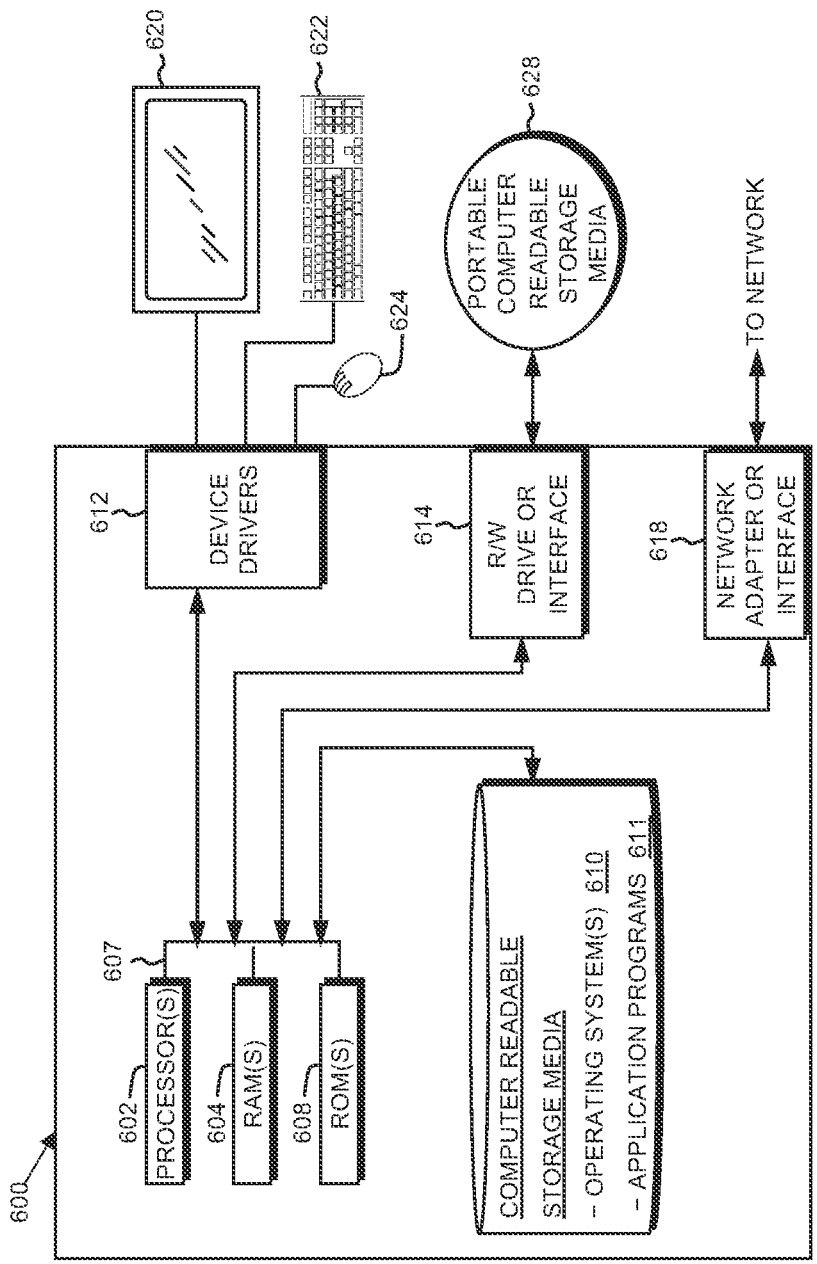
FIG. 6 depicts a block diagram illustrating components of the software application of FIG. 1, in accordance with an embodiment of the invention.

FIG. 6 is a block diagram of components 600 of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602, 604 is representative of any electronic device capable of executing machine-readable program instructions. Data processing system 602, 604 may be representative of a smart phone, a computer system, PDA, or other electronic devices. Examples of computing systems, environments, and/or configurations that may represented by data processing system 602, 604 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices. The one or more servers may include respective sets of components illustrated in FIG. 6. Each of the sets of components include one or more processors 602, one or more computer-readable RAMs 608 and one or more computer-readable ROMs 610 on one or more buses 607, and one or more operating systems 610 and one or more computer-readable tangible storage devices 616. The one or more operating systems 610 may be stored on one or more computer-readable tangible storage devices 616 for execution by one or more processors 602 via one or more RAMs 608 (which typically include cache memory). In the embodiment illustrated in FIG. 6, each of the computer-readable tangible storage devices 616 is a magnetic disk storage device of an internal hard drive. Alternatively, each of the computer-readable tangible storage devices 616 is a semiconductor storage device such as ROM 610, EPROM, flash memory or any other computer-readable tangible storage device that can store a computer program and digital information. Each set of components 600 also includes a R/W drive or interface 614 to read from and write to one or more portable computer-readable tangible storage devices 608 such as a CD-ROM, DVD, memory stick, magnetic tape, magnetic disk, optical disk or semiconductor storage device. A software program can be stored on one or more of the respective portable computer-readable tangible storage devices 608, read via the respective R/W drive or interface 614 and loaded into the respective hard drive.

Each set of components 600 may also include network adapters (or switch port cards) or interfaces 616 such as a TCP/IP adapter cards, wireless wi-fi interface cards, or 3G or 4G wireless interface cards or other wired or wireless communication links. Applicable software can be downloaded from an external computer (e.g., server) via a network (for example, the Internet, a local area network or other, wide area network) and respective network adapters or interfaces 616. From the network adapters (or switch port adaptors) or interfaces 616, the centralized platform is loaded into the respective hard drive 608. The network may comprise copper wires, optical fibers, wireless transmission, routers, firewalls, switches, gateway computers and/or edge servers.

Each of components 600 can include a computer display monitor 620, a keyboard 622, and a computer mouse 624. Components 600 can also include touch screens, virtual keyboards, touch pads, pointing devices, and other human interface devices. Each of the sets of components 600 also includes device processors 602 to interface to computer display monitor 620, keyboard 622 and computer mouse 624. The device drivers 612, R/W drive or interface 614 and network adapter or interface 618 comprise hardware and software (stored in storage device 604 and/or ROM 606).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
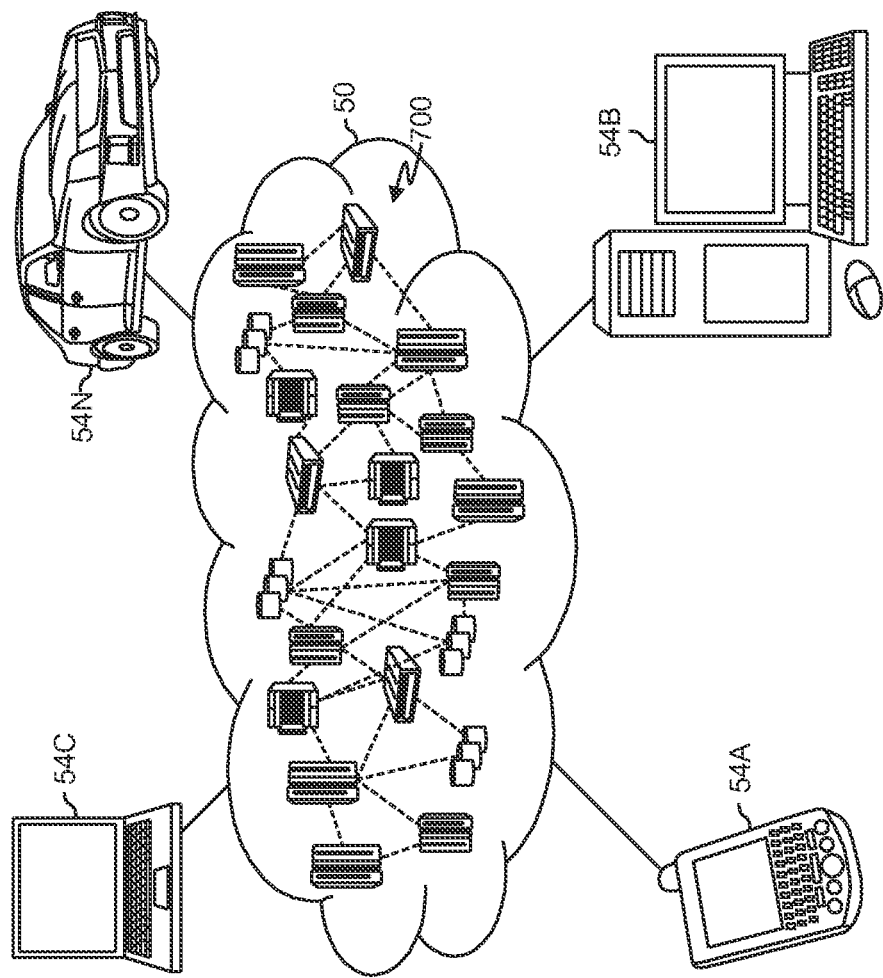
FIG. 7 depicts a cloud-computing environment, in accordance with an embodiment of the present invention.

Referring now to FIG. 7, illustrative cloud computing environment 700 is depicted. As shown, cloud computing environment 700 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 54A-N shown in FIG. 7 are intended to be illustrative only and that computing nodes 50 and cloud computing environment 700 can communicate with any type of computerized device over any type of network and/or network addressable connection (e.g., using a web browser).

Figure 8:
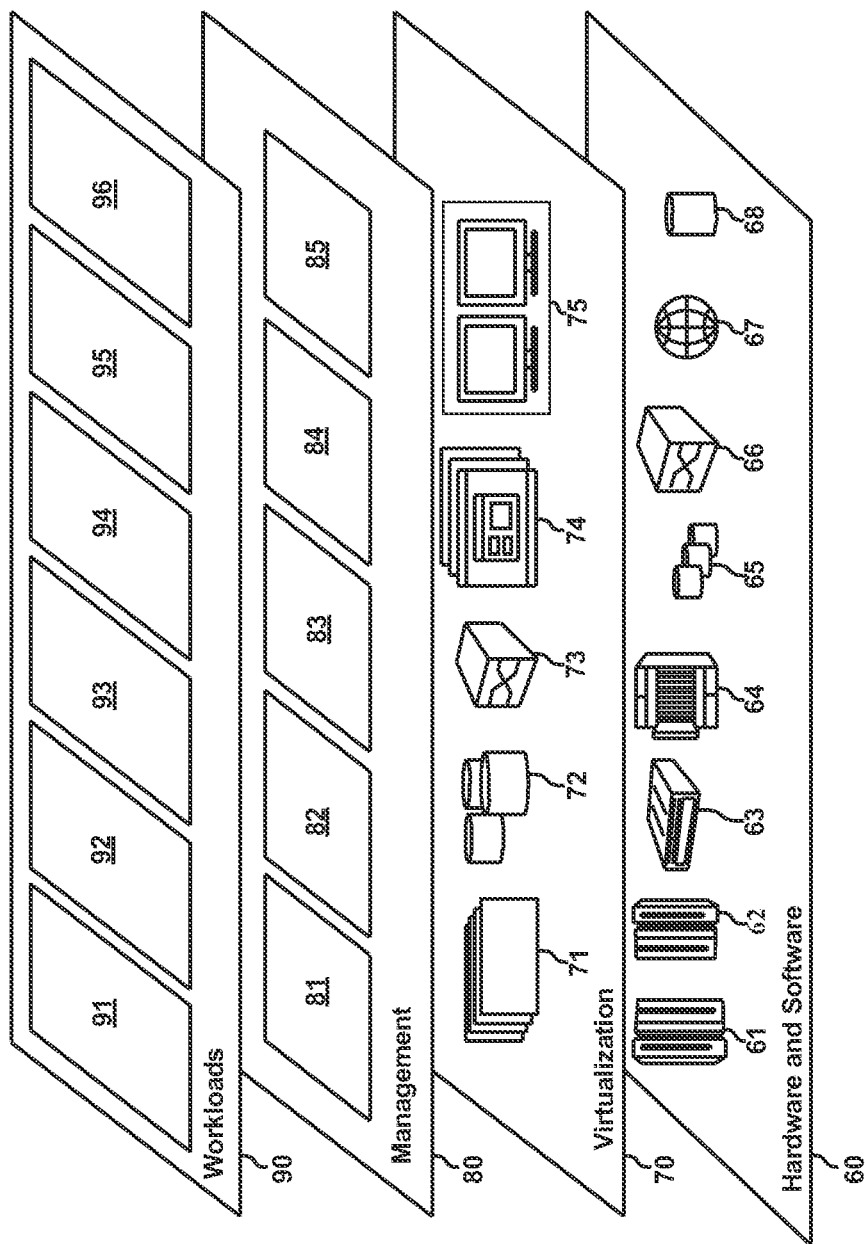
FIG. 8 depicts abstraction model layers, in accordance with an embodiment of the present invention.

Referring now to FIG. 8 a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for virtual reality (VR) based push notifications comprising:
pushing, by a computing device, a notification to a user-side computing device hosting a VR environment being utilized by a user and evaluating the notification;
evaluating, by the computing device, a plurality of electrical activity associated with a predicted sentiment of the user to the notification to determine at least one sentiment included in the notification and compatibility between the notification and the user-side computing device hosting the VR environment for the user;
mapping, by the computing device, a plurality of patterns of motions derived from the plurality of electrical activity to an avatar model; and
based on the evaluation, generating, by the computing device, a notification media content derived from the notification comprising an interactive notification avatar expressing the predicted sentiment based on the avatar model to be presented in the VR environment to the user.

2. The computer-implemented method of claim 1, wherein evaluating the notification comprises:
receiving, by the computing device, a plurality of parameters associated with the user; and
tagging, by the computing device, a plurality of metadata associated with the notification to the plurality of parameters;
wherein the interactive notification avatar is generated based on the plurality of metadata and the plurality of parameters.

3. The computer-implemented method of claim 1, wherein evaluating compatibility comprises:
analyzing, by the computing device, one or more of the computing resources and hardware capabilities of the user-side computing device; and
determining, by the computing device, if the user-side computing device is configured to embed the notification in the VR environment based on the analysis;
wherein the notification media content is multimedia generated and presented to the user in based on the determination indicating the user-side computing device is not configured to embed the notification in the VR environment.

4. The computer-implemented method of claim 1, wherein generating the interactive notification avatar comprises:
applying, by the computing device, natural language processing to detected text associated with the notification.

5. The computer-implemented method of claim 4, wherein the interactive notification avatar emits audio derived from the natural language processing of the detected text to the user in the VR environment.

6. The computer-implemented method of claim 1, wherein evaluating the notification comprises:
utilizing, by the computing device, one or more machine learning algorithms to predict a category classification associated with the notification;
assigning, by the computing device, the category classification to future push notifications including relevant or similar content of the notification.

7. A computer program product for virtual reality (VR) based push notifications, the computer program product comprising a computer readable storage medium having program instructions embodied therewith, wherein the computer readable storage medium is not a transitory signal per se, the program instructions being executable by a processor to cause the processor to perform a method comprising:
pushing a notification to a user-side computing device hosting a VR environment being utilized by a user and evaluating the notification;
evaluating a plurality of electrical activity associated with a predicted sentiment of the user to the notification to determine at least one sentiment included in the notification and compatibility between the notification and the user-side computing device hosting the VR environment for the user;
mapping a plurality of patterns of motions derived from the plurality of electrical activity to an avatar model; and
based on the evaluation, generating a notification media content derived from the notification comprising an interactive notification avatar expressing the predicted sentiment based on the avatar model to be presented in the VR environment to the user.

8. The computer program product of claim 7, wherein evaluating the notification comprises:
receiving a plurality of parameters associated with the user; and
tagging a plurality of metadata associated with the notification to the plurality of parameters;
wherein the interactive notification avatar is generated based on the plurality of metadata and the plurality of parameters.

9. The computer program product of claim 7, wherein evaluating compatibility comprises:
analyzing one or more of the computing resources and hardware capabilities of the user-side computing device; and
determining, by the computing device, if the user-side computing device is configured to embed the notification in the VR environment based on the analysis;
wherein the notification media content is multimedia generated and presented to the user based on the determination indicating the user-side computing device is not configured to embed the notification in the VR environment.

10. The computer program product of claim 7, wherein generating the interactive notification avatar comprises:
applying natural language processing to detected text associated with the notification.

11. The computer program product of claim 10, wherein the interactive notification avatar emits audio derived from the natural language processing of the detected text to the user in the VR environment.

12. The computer program product of claim 7, wherein evaluating the notification comprises:
utilizing one or more machine learning algorithms to predict a category classification associated with the notification;
assigning the category classification to future push notifications including relevant or similar content of the notification.

13. A system comprising:
a processor; and
a memory, wherein the memory comprises instructions that when executed by the processor causes the processor to perform a method comprising:

pushing a notification to a user-side computing device hosting a VR environment being utilized by a user and evaluating the notification;

evaluating a plurality of electrical activity associated with a predicted sentiment of the user to the notification to determine at least one sentiment included in the notification and compatibility between the notification and the user-side computing device hosting the VR environment for the user;

mapping a plurality of patterns of motions derived from the plurality of electrical activity to an avatar model; and based on the evaluation, generating a notification media content derived from the notification comprising an interactive notification avatar expressing the predicted sentiment based on the avatar model to be presented in the VR environment to the user.

14. The system of claim 5, wherein evaluating the notification comprises:

receiving a plurality of parameters associated with the user; and tagging a plurality of metadata associated with the notification to the plurality of parameters;

wherein the interactive notification avatar is generated based on the plurality of metadata and the plurality of parameters.

15. The system of claim 13, wherein evaluating compatibility comprises:

analyzing one or more of the computing resources and hardware capabilities of the user-side computing device; and determining if the user-side computing device is configured to embed the notification in the VR environment based on the analysis;

wherein the notification media content is multimedia generated and presented to the user based on the determination indicating the user-side computing device is not configured to embed the notification in the VR environment.

16. The system of claim 5, wherein generating the interactive notification avatar comprises: applying natural language processing to detected text associated with the notification.

17. The system of claim 16, wherein the interactive notification avatar emits audio derived from the natural language processing of the detected text to the user in the VR environment.

* * * * *